United States Patent
Nash et al.

(10) Patent No.: US 9,821,726 B2
(45) Date of Patent: Nov. 21, 2017

(54) STEERING WHEEL WITH KEYBOARD

(71) Applicant: Steering Solutions IP Holding Corporation, Saginaw, MI (US)

(72) Inventors: Richard P. Nash, Frankenmuth, MI (US); Bryan L. Faist, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/059,615

(22) Filed: Mar. 3, 2016

(65) Prior Publication Data

US 2017/0253191 A1 Sep. 7, 2017

(51) Int. Cl.
| | |
|---|---|
| *B62D 1/04* | (2006.01) |
| *B60K 35/00* | (2006.01) |
| *B60R 11/04* | (2006.01) |
| *B60R 11/02* | (2006.01) |
| *G06F 3/0488* | (2013.01) |
| *B60R 16/027* | (2006.01) |
| *B60R 11/00* | (2006.01) |

(52) U.S. Cl.
CPC ......... *B60R 11/0264* (2013.01); *B60K 35/00* (2013.01); *B62D 1/046* (2013.01); *G06F 3/04886* (2013.01); *B60K 2350/1008* (2013.01); *B60K 2350/1072* (2013.01); *B60K 2350/928* (2013.01); *B60R 16/027* (2013.01); *B60R 2011/001* (2013.01)

(58) Field of Classification Search
CPC .............. B60R 11/0264; B60R 16/027; B60R 2011/001; B62D 1/04; B62D 1/046; B60K 35/00; B60K 2350/928; B60K 2350/1008; B60K 2350/1072; G06F 3/04886

See application file for complete search history.

(56) References Cited

U.S. PATENT DOCUMENTS

| | | | |
|---|---|---|---|
| 3,011,802 A | 12/1961 | Ackerman | |
| 3,643,606 A * | 2/1972 | Vise | B60N 3/005 108/44 |
| 3,937,101 A | 2/1976 | Wade | |
| 4,287,621 A | 9/1981 | Kertz | |
| 4,453,788 A | 6/1984 | Russell | |
| 5,060,581 A * | 10/1991 | Malinski | B60N 3/005 108/44 |
| 5,181,759 A | 1/1993 | Doolittle | |
| 5,193,777 A | 3/1993 | Faulstich | |
| 5,555,502 A * | 9/1996 | Opel | B60H 1/00985 701/36 |

(Continued)

FOREIGN PATENT DOCUMENTS

| | | |
|---|---|---|
| DE | 2025003 A | 12/1971 |
| DE | 102005053176 A1 | 10/2007 |

(Continued)

*Primary Examiner* — Adam D Rogers
(74) *Attorney, Agent, or Firm* — Cantor Colburn LLP (57) ABSTRACT

A steering wheel assembly includes a panel and a projector assembly. The panel is connected to a steering wheel body and has a first surface disposed opposite a second surface. The projector is connected to the steering wheel body and displays a virtual input device on at least one of the first surface and the second surface, while the steering wheel is in a non-rotational condition.

19 Claims, 6 Drawing Sheets

(56) References Cited

U.S. PATENT DOCUMENTS

| | | | |
|---|---|---|---|
| 5,662,047 A | 9/1997 | Metcalf | |
| 6,227,425 B1 | 5/2001 | Ware, Sr. | |
| 6,669,233 B2 | 12/2003 | Gabriel | |
| 7,315,291 B2 | 1/2008 | Yoshihara et al. | |
| 7,474,204 B2 * | 1/2009 | Songwe | B60K 35/00 296/37.12 |
| 7,611,198 B2 * | 11/2009 | Schweizer | B60N 2/4876 297/146 |
| 7,775,584 B2 | 8/2010 | Hughes et al. | |
| 8,474,860 B2 | 7/2013 | Ohoka et al. | |
| 8,538,628 B2 | 9/2013 | Backman | |
| 9,132,787 B2 * | 9/2015 | Cooper | B60R 11/02 |
| 9,193,375 B2 * | 11/2015 | Schramm | B60K 35/00 |
| 9,442,289 B2 * | 9/2016 | Nishima | B60K 35/00 |
| 9,552,148 B2 | 1/2017 | Kim et al. | |
| 2002/0073899 A1 | 6/2002 | Chen | |
| 2005/0076815 A1 * | 4/2005 | Twyford | G06F 3/0202 108/44 |
| 2006/0146074 A1 | 7/2006 | Harrison | |
| 2007/0099465 A1 | 5/2007 | Ruetz | |
| 2007/0205875 A1 * | 9/2007 | De Haan | H04M 1/575 340/425.5 |
| 2012/0074674 A1 | 3/2012 | Ohoka et al. | |
| 2012/0287050 A1 * | 11/2012 | Wu | G06F 1/1673 345/168 |
| 2013/0002416 A1 | 1/2013 | Gazit | |
| 2014/0195096 A1 * | 7/2014 | Schliep | G06F 3/011 701/29.1 |
| 2015/0283926 A1 | 10/2015 | Hamdoon et al. | |
| 2016/0001807 A1 | 1/2016 | Hans et al. | |
| 2016/0114770 A1 | 4/2016 | Lombrozo | |
| 2016/0200344 A1 | 7/2016 | Sugioka et al. | |
| 2016/0244070 A1 | 8/2016 | Bendewald et al. | |
| 2016/0304123 A1 | 10/2016 | Lewis et al. | |
| 2016/0325662 A1 * | 11/2016 | Nash | B62D 1/04 |
| 2016/0368522 A1 * | 12/2016 | Lubischer | B62D 1/181 |
| 2016/0375924 A1 * | 12/2016 | Bodtker | B62D 1/046 74/552 |
| 2016/0375926 A1 * | 12/2016 | Lubischer | B62D 1/183 74/493 |
| 2016/0375927 A1 | 12/2016 | Schulz et al. | |

FOREIGN PATENT DOCUMENTS

| | | |
|---|---|---|
| DE | 102010050699 A1 | 8/2011 |
| DE | 102016001257 A1 | 9/2016 |

* cited by examiner

STEERING WHEEL WITH KEYBOARD

BACKGROUND OF THE INVENTION

The present disclosure relates to a steering wheel provided with a keyboard.

Vehicles may be equipped with systems and devices to semi-autonomously or autonomously control a vehicle and perform vehicle maneuvers. The systems or devices may provide driving control with minimal driver intervention to reduce the driving burden on the driver. Some systems or devices may enable a driver to remove their hands from the steering wheel when the situation may permit such hands-free operation.

SUMMARY OF THE INVENTION

A steering wheel assembly is provided. The steering wheel assembly includes a panel and a projector assembly. The panel is connected to a steering wheel body and has a first surface disposed opposite a second surface. The projector assembly is connected to the steering wheel body and displays a virtual input device on at least one of the first surface and the second surface, while the steering wheel is in a non-rotational condition.

A steering wheel assembly is provided. The steering wheel assembly includes a steering wheel having a projection surface and a projector. The projector is connected to the steering wheel and is configured to project a virtual input device onto the projection surface. The projector is movable between a stored position in which the projector is received within the steering wheel body and a deployed position in which the projector extends above the projection surface, while the steering wheel is in a non-rotational condition.

A method of providing a virtual input device to a vehicle operator is provided. A projector connected to a steering wheel is enabled to be moved from a stored position to a deployed position in response to activation of an autonomous driving assisted system that operatively decouples the steering wheel from the steering shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
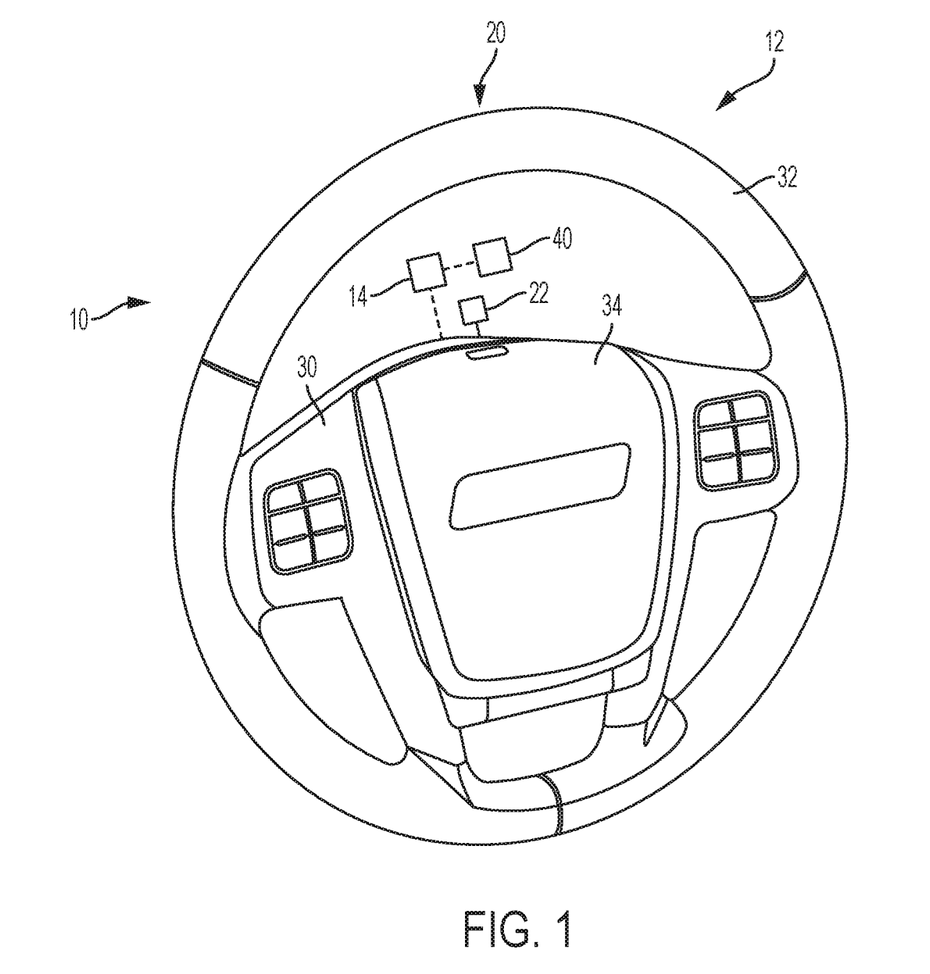
FIG. 1 is a perspective view of a vehicle steering system having a steering wheel assembly with a panel in a closed position.
Figure 2:
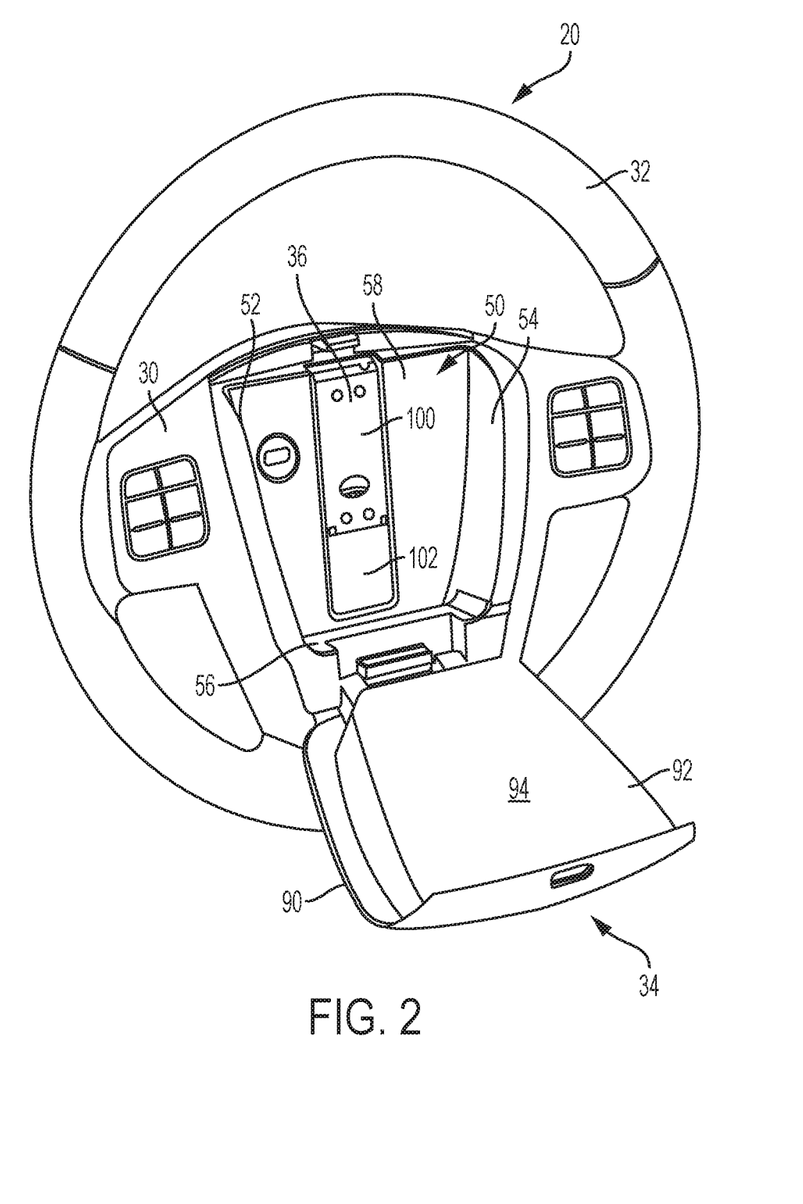
FIG. 2 is a perspective view of the steering wheel assembly having the panel in an open position.
Figure 3:
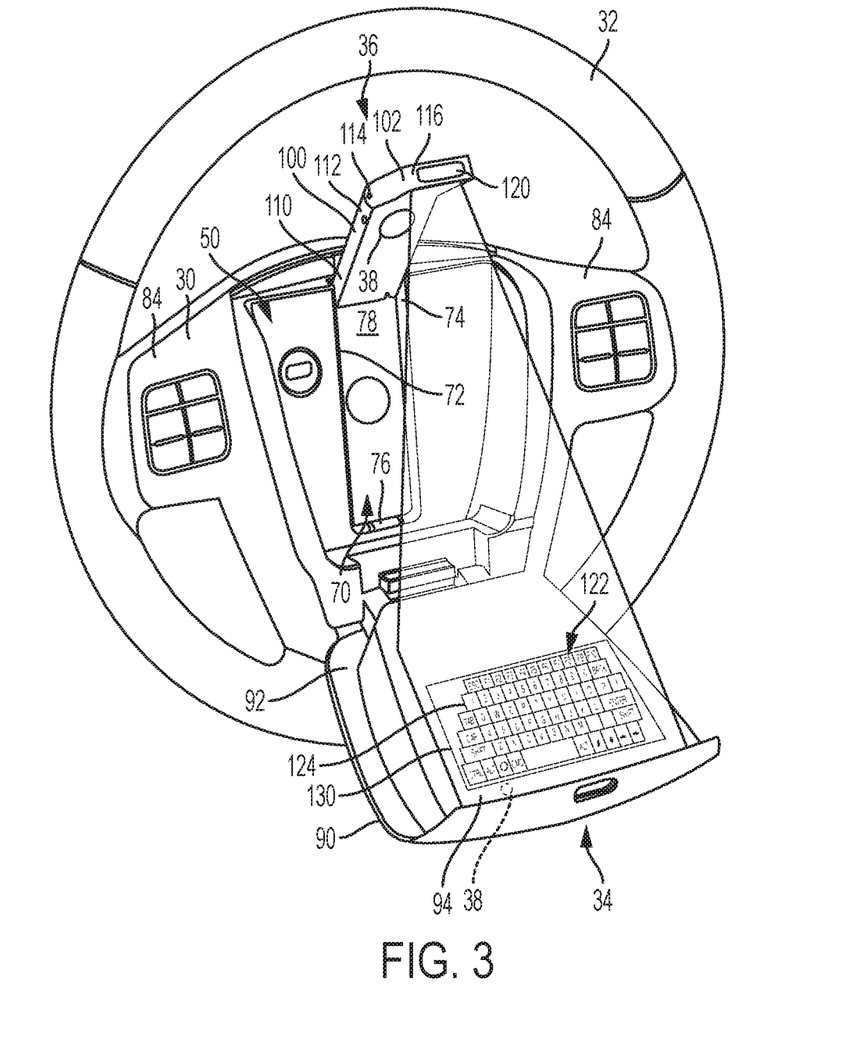
FIG. 3 is a perspective view of the steering wheel assembly having the panel in the open position and a projector in a deployed position.

Referring to FIGS. 1-3, a vehicle steering system 10 includes a steering wheel assembly 12 in communication with an autonomous driving assisted steering system 14. The vehicle steering system 10 is provided with a vehicle, such as a motor vehicle like a truck, bus, farm equipment, military transport vehicle, weaponry vehicle, or cargo loading equipment for land, air, or marine vessels.

The steering wheel assembly 12 may be configured to pivot a pair of vehicle wheels in response to rotation of a steering wheel 20 via a steering shaft 22. The steering shaft 22 extends through a steering column along a longitudinally extending axis. The steering wheel 20 may be directly coupled to the steering shaft 22 via a coupling mechanism. In at least one embodiment, the steering wheel 20 may not be directly coupled to the steering shaft 22 but may be provided as part of a steer-by-wire steering system arrangement or other steering arrangement. The steer-by-wire steering system arrangement may include a plurality of vehicle sensors and the autonomous driving assisted steering system 14 in communication with a vehicle controller that may interpret a position of the steering wheel 20 that corresponds to an amount of angular rotation or pivoting of the steering shaft 22 that may be pivoted by an electric motor or the like.

Regardless of the configuration of the steering wheel assembly 12, the autonomous driving assisted steering system 14 may operatively disconnect the steering wheel 20 from the steering shaft 22. The steering wheel 20 may be at least partially uncoupled, substantially uncoupled, or completely mechanically uncoupled from the steering shaft 22 such that the steering wheel 20 no longer rotates while the autonomous driving assisted steering system 14 is active. The autonomous driving assisted steering system 14 may mechanically or electronically uncouple (decouple) the steering wheel 20 from the steering shaft 22 via a clutch or the coupling mechanism interposed between the steering wheel 20 and the steering shaft 22. In at least one embodiment, the activation of the autonomous driving assisted steering system 14 may not operatively decouple the steering wheel 20 from the steering shaft 22 but a servo actuator may counter rotate the steering wheel 20 in response to vehicle maneuvers being performed by the autonomous driving assisted steering system 14.

The operation of the vehicle semi-autonomously or autonomously by the autonomous driving assisted steering system 14 may operatively disconnect the steering wheel 20 from the steering shaft 22 and may retract the steering wheel 20. The steering wheel 20 is retracted by displacing the steering wheel 20 forward within the vehicle or retracted into a portion of the steering column away from an operator of the vehicle because it is no longer being used by the operator of the vehicle to control the vehicle. The retraction of the steering wheel 20 may enlarge the driver's personal space for comfort and convenience.

During situations in which the steering wheel 20 is operatively disconnected from the steering shaft 22 and in a retracted position an operator of the vehicle may desire to interact with a vehicle infotainment system or other systems that may be in communication with the vehicle. The operator of the vehicle may wish to send a text or SMS message, input a desired location or other search criteria, interface with vehicle systems, or the like. Therefore, it may be desirable to provide an interface disposed on the steering wheel 20 that may permit the operator of the vehicle to provide an input while the autonomous driving assisted steering system 14 is active and the steering wheel 20 is selectively or operatively decoupled from the steering shaft 22 and in a non-rotational condition.

The steering wheel 20 includes a steering wheel body 30, a steering wheel handle 32, a panel 34, a projector assembly 36, an input detection device 38, and a controller 40.

The steering wheel body 30 defines a compartment 50 that receives the projector assembly 36. The compartment 50 includes a first wall 52, a second wall 54, a third wall 56, and a fourth wall 58. The second wall 54 is spaced apart from and is disposed substantially parallel to the first wall 52. The third wall 56 extends between bottom portions of the first wall 52 and the second wall 54. The third wall 56 is disposed substantially perpendicular to the bottom portions of the first wall 52 and the second wall 54. In at least one embodiment, the first wall 52 and the second wall 54 may become progressively farther apart from each other in the direction extending away from the third wall 56. The fourth wall 58 extends between the first wall 52, the second wall 54, and the third wall 56. The fourth wall 58 is substantially planar and is disposed further from the panel 34 than the first wall 52, the second wall 54, and the third wall 56 such that the compartment 50 is recessed within the steering wheel body 30.

The fourth wall 58 of the compartment 50 defines a central recess 70. The central recess 70 includes a first recess wall 72, a second recess wall 74, a third recess wall 76, and a fourth recess wall 78. The second recess wall 74 is spaced apart from and disposed opposite the first recess wall 72. The second recess wall 74 is disposed substantially parallel to the first recess wall 72. The third recess wall 76 extends from a bottom portion of the first recess wall 72 to a bottom portion of the second recess wall 74. The third recess wall 76 is disposed substantially perpendicular to the first recess wall 72 and the second recess wall 74. The fourth recess wall 78 extends between the first recess wall 72, the second recess wall 74, and the third recess wall 76. The fourth recess wall is substantially planar and is disposed further from the panel 34 than the first recess wall 72, the second recess wall 74, and the third recess wall 76.

The steering wheel handle 32 extends at least partially about the steering wheel body 30. The steering wheel handle 32 is connected to the steering wheel body 30 by an extension portion 84. The steering wheel handle 32 defines a grip that an operator of the vehicle may rest their hands on and/or grasp the steering wheel 20.

The panel 34 is pivotally connected to the steering wheel body 30. The panel 34 is movable between a closed position (FIG. 1) to inhibit access to the compartment 50 and an open position (FIGS. 2 and 3) to permit access to the compartment 50. The panel 34 includes a first surface 90 and a second surface 92 disposed opposite the first surface 90. At least one of the first surface 90 and the second surface 92 may be configured as a projection surface 94 on to which the projector assembly 36 may project an image.

The projector assembly 36 is connected to the steering wheel body 30. The projector assembly 36 is pivotally connected to the first wall 52 and the second wall 54 of the compartment 50. In at least one embodiment, the projector assembly 36 is pivotally connected to the fourth wall 58 of the compartment 50. In another embodiment, the projector assembly 36 is pivotally connected to the first recess wall 72 and the second recess wall 74 of the central recess 70. In yet another embodiment, the projector assembly 36 is connected to the steering wheel handle 32 of the steering wheel 20.

The projector assembly 36 is extendable or movable between a stored position in which the projector assembly 36 is disposed within at least one of the compartment 50 and the central recess 70 as shown in FIG. 2 and a deployed position in which the projector assembly 36 is disposed above the panel 34 and outside of at least one of the compartment 50 and the central recess 70. The projector assembly 36 includes a first portion 100 and a second portion 102.

The first portion 100 includes a first end 110 and a second end 112 spaced apart from the first end 110. The first end 110 is pivotally connected to the fourth wall 58 of the compartment 50 or the first recess wall 72 and the second recess wall 74 of the central recess 70. The second end 112 is pivotally connected to the second portion 102. The second portion 102 includes a first end 114 and a second end 116 spaced apart from the first end 114. The first end 114 of the second portion 102 is pivotally connected to the second end 112 of the first portion 100. The second portion 102 includes a projector 120 disposed proximate the second end 116.

The projector 120 projects or displays a virtual input device 122 on at least one of the first surface 90 and the second surface 92. The projector 120 projects or displays the virtual input device 122 on the first surface 90 when the panel 34 is in the closed position. The projector 120 projects or displays a virtual input device 122 on the second surface 92 when the panel 34 is in the open position.

The projector 120 may be a laser or other optical output device that projects a visual pattern representative of a graphical user interface as the virtual input device 122. The virtual input device 122 may be a visually projected image of a keyboard having a plurality of virtual keys 124. The keyboard may be a "QWERTY" keyboard, an adaptive keyboard, or other keyboard having a plurality of key patterns displayed. In at least one embodiment, at least one of the first surface 90 and the second surface 92 is provided with a bump or a protrusion located to indicate the "home row" or "home key positions" of the virtual keys 124 of the virtual input device 122. An operator of the vehicle is able to provide a user input that is interpreted by the input detection device 38 and provided to a controller 40 in communication with a vehicle infotainment system, other vehicle system, or a nomadic device.

The input detection device 38 detects motions of an operator within the virtual input device 122. The input detection device 38 projects or defines a detection area 130 about the virtual input device 122. Referring to FIG. 3, the input detection device 38 may be connected to the projector assembly 36. In this embodiment, the input detection device 38 may be an optical sensor or the like that detects the position of an operator's finger or hand within the virtual input device 122 relative to at least one of the plurality of virtual keys 124 via light interruption or light reflection. In at least one embodiment, the input detection device 38 is disposed proximate at least one of the first surface 90 and the second surface 92 of the panel 34. In this embodiment, the input detection device 38 may be a vibratory sensor disposed proximate the detection area 130. The vibratory sensor may detect a vibration signal or wave that may result from the impact of an operator's finger or hand or an object within at least one of the plurality of virtual keys 124 of the virtual input device 122. The input detection device 38 may output a signal indicative of the virtual key of the plurality of virtual keys 124 of the virtual input device 122 impacted by the operator's finger and/or hand or an object based on the amplitude or duration of the vibration signal or vibration wave.

Figure 4:
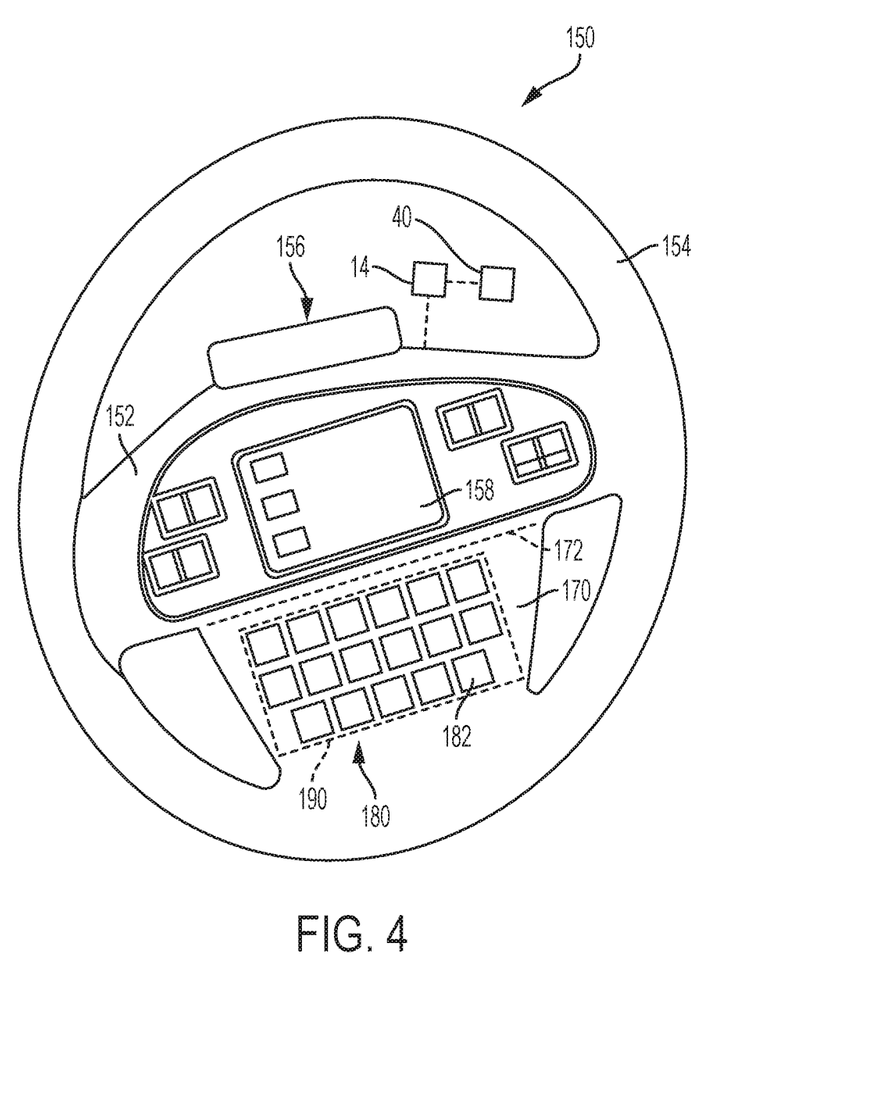
FIG. 4 is a perspective view of the steering wheel assembly and the projector in a stored position.
Figure 5:
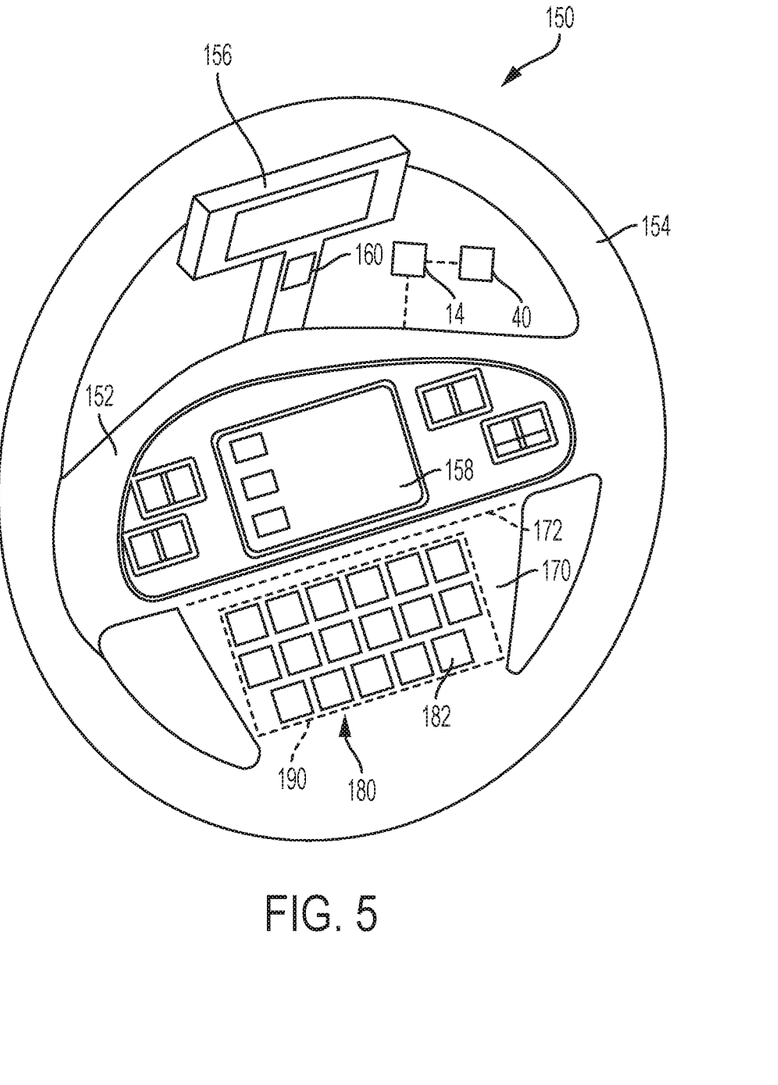
FIG. 5 is a perspective view of the steering wheel assembly and the projector in a deployed position.

Referring to FIGS. 4-5, a steering wheel assembly 150 is shown. The steering wheel assembly 150 is in communication with the autonomous driving assisted steering system 14 and the controller 40. The steering wheel assembly 150 includes a steering wheel having a steering wheel body 152, a steering wheel handle 154, a projector 156, a display unit 158, and an input detection device 160.

The steering wheel handle 154 extends from the steering wheel body 152. The steering wheel handle 154 extends at least partially around the steering wheel body 152. The steering wheel body 152 defines a projection surface 170. The projection surface 170 is disposed on a surface of the steering wheel body 152 that faces towards an operator of the vehicle. The projection surface 170 is disposed on the steering wheel body 152 below an airbag cover split seam 172.

The projector 156 is connected to the steering wheel body 152. The projector 156 is disposed on a top portion of the steering wheel body 152. The projector 156 is movable between a stored position in which the projector 156 is at least partially received within the steering wheel body 152, as shown in FIG. 4, and a deployed position in which the projector 156 extends above the projection surface 170, as shown in FIG. 5. The projector 156 may be slidingly disposed on the top portion of the steering wheel body 152 such that the projector 156 slides between the stored position and the deployed position in some embodiments. In at least one embodiment, the projector 156 may be rotationally or pivotally deployed.

In response to a user request to activate the projector 156, while the autonomous driving assisted steering system 14 is active and the steering wheel 20 is operatively decoupled from the steering shaft 22, the controller 40 is programmed to command or enable the projector 156 to be deployed from the stored position to the deployed position. In response to the deactivation of the autonomous driving assisted steering system 14 and the steering wheel is commanded to be or is operatively coupled to the steering shaft, the controller 40 is programmed to command or enable the projector 156 to be retracted from the deployed position to the stored position.

The projector 156 projects or displays a virtual input device 180 onto the projection surface 170. The projector 156 may be a laser or other optical output device that projects a visual pattern representative of a graphical user interface as the virtual input device 180. The virtual input device 180 may be a visually projected image of a keyboard having a plurality of virtual keys 182. An operator of the vehicle is able to provide a user input that is interpreted by the input detection device 160 and provided to the display unit 158 and the controller 40 in communication with a vehicle infotainment system, other vehicle system, or a nomadic device.

The display unit 158 is disposed on the steering wheel body 152. The display unit 158 is disposed above the projection surface 170 and is disposed above the airbag cover split seam 172. The display unit 158 is a monitor screen that displays a user input provided into the virtual input device 180. The display unit 158 and the projector 156 are in communication with the controller 40. In response to a user input provided to at least one of the plurality of virtual keys 182 of the virtual input device 180, the user input is interpreted by the input detection device 160 and/or the controller 40 and output for display a user input via the display unit 158.

The input detection device 160 is connected to the projector 156. The input detection device 160 faces towards the projection surface 170. The input detection device 160 is configured to detect motions of an operator within the virtual input device 180 relative to the plurality of virtual keys 182. The input detection device 160 projects or defines a detection area 190 about the virtual input device 180.

Figure 6:
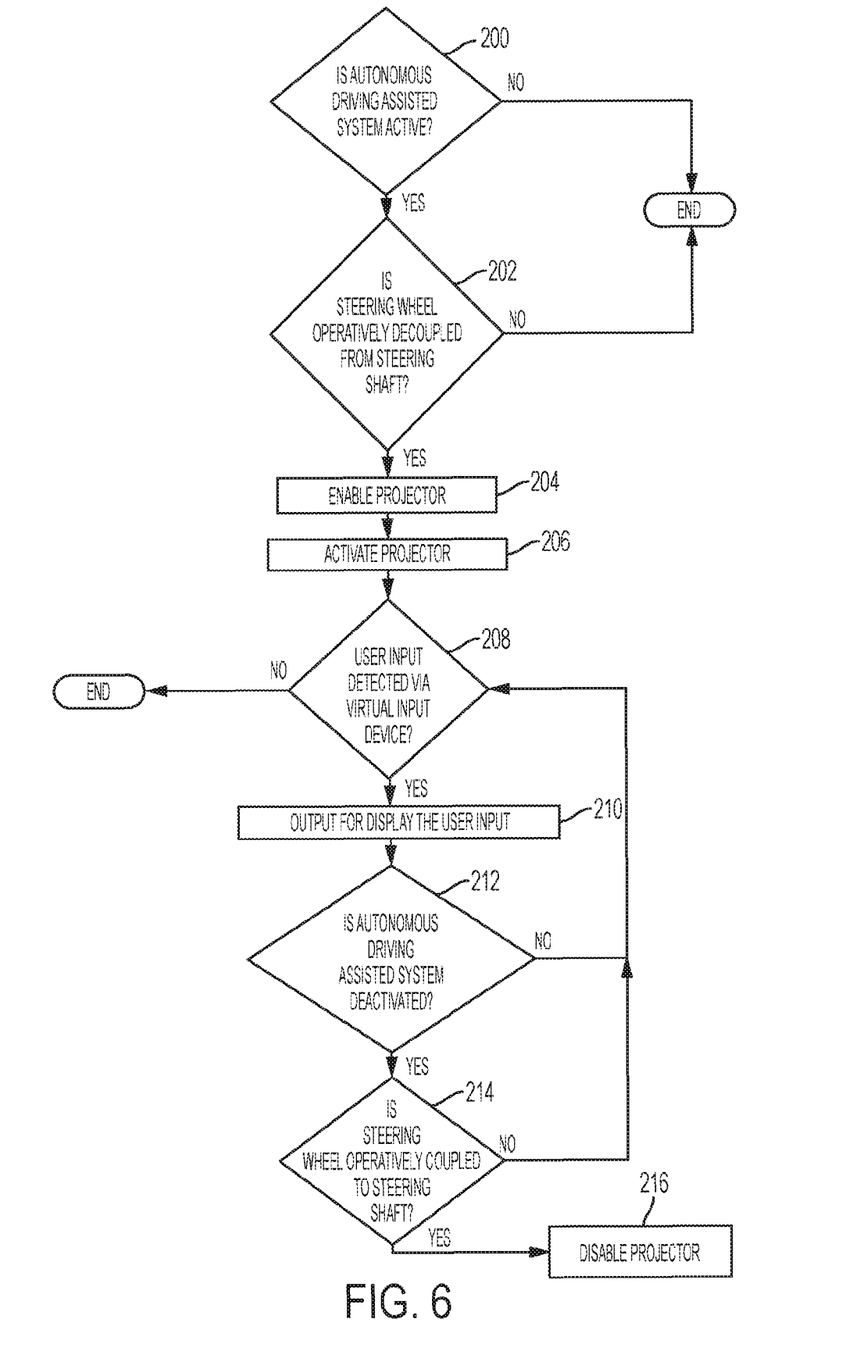
FIG. 6 is a flow chart of a method of providing a virtual input device to a vehicle operator.

Referring to FIG. 6, a flowchart of a method of providing a virtual input device to a vehicle operator is shown. The method may be executed by the controller 40 and may be implemented as a closed loop control system. For brevity the method will be described in the context of a single method iteration below.

The method may monitor and receive data indicative of the state of activation of the autonomous driving assisted steering system 14 and whether a steering wheel is operatively coupled to a steering shaft. At block 200, the method determines if the autonomous driving assisted steering system 14 is active. Should the autonomous driving assisted steering system 14 not be active, the method may end. If the autonomous driving assisted steering system 14 is active, the method may continue to block 202.

At block 202 the method determines if the steering wheel is operatively decoupled from the steering shaft. Should the steering wheel be operatively coupled to the steering shaft, the method may end. If the steering wheel is operatively decoupled from the steering shaft in response to activation of the autonomous driving assisted steering system 14, the method may continue to block 204. At block 204 the projector may be enabled to move from a stored position to a deployed position. At block 206 the projector may be activated such that the projector may project a virtual input device onto a projection surface of the steering wheel.

The method may continue to monitor if a user input has been provided to the virtual input device projected onto the projection surface of the steering wheel by the projector. At block 208 the method determines if a user input is detected within the virtual input device via an input detection device. Should a user input not be detected within the virtual input device via the input detection device, the method may end. If a user input is detected within the virtual input device via the input detection device the method may continue to block 210. At block 210 the method outputs for display the user input via a display unit disposed on the steering wheel or via a vehicle interface.

The method continues to monitor and receive data indicative of the state of activation of the autonomous driving assisted steering system 14 and whether a steering wheel is operatively coupled to a steering shaft. At block 212 the method determines if the autonomous driving assisted steering system 14 has been deactivated. The autonomous driving assisted steering system 14 may be deactivated in response to a user input to deactivate the autonomous driving assisted steering system 14 or an operator intervention to control the vehicle by attempting to operate the steering wheel. The steering wheel is operatively coupled to the steering shaft in response to the deactivation of the autonomous driving assisted steering system 14. Should the autonomous driving assisted steering system 14 is active, the method may return to block 208. If the autonomous driving assisted steering system 14 is deactivated, the method may continue to block 214.

At block 214 the method determines if the steering wheel is operatively coupled to the steering shaft. Should the steering wheel be operatively decoupled from the steering shaft, the method may end. If the steering wheel is operatively coupled to the steering shaft in response to deactivation of the autonomous driving assisted steering system 14, the method may continue to block 216. At block 216 the projector may be disabled such that the projector does not project the virtual input device onto the projection surface of the steering wheel and the projector is commanded to move from the deployed position to the stored position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A steering wheel assembly comprising:
a panel connected to a steering wheel body, the panel having a first surface disposed opposite a second surface;
a projector assembly connected to the steering wheel body, the projector assembly displays a virtual input device on at least one of the first surface and the second surface, while the steering wheel is in a non-rotational condition,
wherein the steering wheel body defines a compartment configured to receive the projector assembly.

2. The steering wheel assembly of claim 1, wherein the compartment has a first wall, a second wall spaced apart from the first wall, and a third wall extending between the first wall and the second wall.

3. The steering wheel assembly of claim 2, wherein the projector assembly is pivotally connected to the first wall and the second wall.

4. The steering wheel assembly of claim 3, wherein the projector assembly is movable between a stored position in which the projector assembly is received within the compartment and a deployed position in which the projector assembly is disposed above the panel.

5. The steering wheel assembly of claim 1, wherein the panel is movable between a closed position and an open position.

6. The steering wheel assembly of claim 5, wherein the projector assembly displays the virtual input device on the first surface when the panel is in the closed position.

7. The steering wheel assembly of claim 6, wherein the projector assembly displays the virtual input device on the second surface when the panel is in the open position.

8. The steering wheel assembly of claim 7, further comprising an input detection device connected to the projector assembly, the input detection device detects motions of an operator proximate the virtual input device.

9. A steering wheel assembly comprising:
a steering wheel having a projection surface; and
a projector connected to the steering wheel, the projector being movable between a stored position in which the projector is received within the steering wheel body and a deployed position in which the projector extends above the projection surface, the projector configured to project a virtual input device onto the projection surface, while the steering wheel is in a non-rotational condition.

10. The steering wheel assembly of claim 9, further comprising a display unit disposed on the steering wheel body above the projection surface.

11. The steering wheel assembly of claim 10, further comprising an input detection device connected to the projector, the input detection device configured to detect motions of an operator within the virtual input device and configured to output for display a user input via the display unit.

12. The steering wheel assembly of claim 11, wherein the display unit and the projector are in communication with a controller.

13. The steering wheel assembly of claim 12, wherein in response to a first user request to activate the projector, the controller is programmed to enable the projector to project the virtual input device onto the projection surface, while the steering wheel is operatively decoupled from a steering shaft.

14. The steering wheel assembly of claim 13, wherein in response to a second user request to operatively couple the steering wheel to the steering shaft, the controller is programmed to disable the projector.

15. A method of providing a virtual input device to a vehicle operator comprising:
enabling a projector connected to a steering wheel to be moved from a stored position to a deployed position, in response to activation of an autonomous driving assisted system that operatively decouples the steering wheel from a steering shaft.

16. The method of claim 15, further comprising:
activating the projector to project a virtual input device onto a projection surface of the steering wheel.

17. The method of claim 16, further comprising:
detecting a user input, outputting for display the user input via a display unit disposed on the steering wheel.

18. The method of claim 16, further comprising:
detecting a user input received via the virtual input device, outputting for display the user input via a vehicle interface.

19. The method of claim 16, further comprising
disabling the projector and moving the projector from the deployed position to the stored position, in response to deactivation of the autonomous driving assisted system that operatively couples the steering wheel from the steering shaft.

* * * * *